United States Patent
Honda et al.

[11] Patent Number: 6,070,617
[45] Date of Patent: Jun. 6, 2000

[54] LIQUID-TRANSFERRING HOSE

[75] Inventors: Yukinori Honda; Fumihiko Yazaki; Masashi Wakabayashi; Riki Takeda; Koji Nakatani, all of Kanagawa, Japan

[73] Assignee: The Yokohama Rubber Co., Ltd., Tokyo, Japan

[21] Appl. No.: 09/295,107

[22] Filed: Apr. 21, 1999

[30] Foreign Application Priority Data

Apr. 23, 1998 [JP] Japan .............................. H10-113702

[51] Int. Cl.[7] .............................. F16L 55/00; G01M 3/18
[52] U.S. Cl. ........................ 138/104; 138/137; 73/49.1; 73/40.5; 116/DIG. 7
[58] Field of Search ................................ 138/104, 137, 138/141, 140; 116/227, DIG. 7; 73/40.5 R, 49.2, 49.1

[56] References Cited

U.S. PATENT DOCUMENTS

| | | | |
|---|---|---|---|
| 3,882,382 | 5/1975 | Johnson | 73/49.1 X |
| 4,446,892 | 5/1984 | Maxwell | 138/104 |
| 4,465,105 | 8/1984 | Slater | 138/104 |
| 5,129,428 | 7/1992 | Winter et al. | 138/104 |
| 5,172,730 | 12/1992 | Driver | 138/104 |
| 5,267,670 | 12/1993 | Foster | 138/104 X |
| 5,654,499 | 8/1997 | Manuli | 138/104 X |
| 5,714,681 | 2/1998 | Furness et al. | 138/104 X |
| 5,743,299 | 4/1998 | Chick et al. | 138/104 X |

FOREIGN PATENT DOCUMENTS 5-272678 10/1993 Japan .

*Primary Examiner*—Patrick Brinson
*Attorney, Agent, or Firm*—Arent Fox Kintner; Plotkin & Kahn, PLLC

[57] ABSTRACT

A liquid-transferring hose of single-carcass configuration, with a rubber tube layer, main pressure-resistant cord layer and cover rubber layer, in this order from the inside, wherein a transponder installed between the rubber tube layer and cover rubber layer transmits and receives waves of specific frequency, which are attenuated by at least −60 dB when passing through liquid to be transferred, and transmits a response signal on receiving the above waves. This design prevents the response signal transmitted by the transponder, when it is covered with leaked liquid, from being detected, to tell occurrence of liquid leakage, allowing liquid leakage to be easily detected during the initial stage.

12 Claims, 16 Drawing Sheets

LIQUID-TRANSFERRING HOSE

BACKGROUND OF THE INVENTION

1. Field of the Invention

This invention relates to a liquid-transferring hose, more particularly an improved hose for undersea, underwater or floating transfer of liquid, such as oil.

2. Description of the Related Art

When liquid such as oil is delivered by a tanker, liquid is generally loaded or unloaded while the tanker is moored offshore. Liquid such as oil is therefore transferred by a hose line on or under the sea, consisting of a number of hoses connected to each other.

When a hose on or under the sea is damaged, liquid such as oil inside may leak out, possibly leading to pollution of the surroundings and serious social problems.

In order to avoid the above problems, a double-carcass hose is developed. It has a main and auxiliary pressure-resistant cord layers with a liquid-holding buffer layer in-between, which holds liquid leaking out through the main cord layer.

This design allows liquid leaking out through the main pressure-resistant cord layer to be shielded by the auxiliary pressure-resistant cord layer and held in the liquid-holding buffer layer if the main pressure-resistant cord layer is damaged.

This design is extended to a hose which shows an apparently visible external change, when the main pressure-resistant layer is damaged to allow inside liquid to leak out into the liquid-holding buffer layer.

Such a hose is characterized by the auxiliary pressure-resistant cord layer provided with an asymmetrical code layer capable of twisting by pressure of the liquid leaking into the liquid-holding buffer layer, as disclosed by Japanese Patent Application Laid-Open No. 5-272678.

The hose of the above structure, characterized by the auxiliary pressure-resistant cord layer provided with an asymmetrical code layer capable of twisting by pressure of the liquid leaking into the liquid-holding buffer layer, allows an internal damage to be easily discovered by external visual observation, because the asymmetrical cord layer on the auxiliary pressure-resistant layer twists by pressure of the liquid leaking through the main pressure-resistant layer into the liquid-holding buffer layer. Twisting of the asymmetrical cord layer can be easily observed visually, when the outer surface of the hose is marked with a colored straight line or the like.

The above hose, however, could not signal any abnormal appearance, such as twisting of the hose, in the absence of liquid pressure when transfer of liquid under pressure is stopped, even when the conventional hose as described above was provided with an asymmetrical cord layer.

Moreover, it showed little abnormality during the initial stage of liquid leakage, because quantity of leaked liquid was too small to change outer appearance of the hose, and consequently it was impossible to find any abnormality at the initial stage of the liquid leakage.

BRIEF SUMMARY OF THE INVENTION

The object of the present invention is to provide a liquid-transferring hose which allows to easily detect liquid leakage during the initial stage, thereby solving the above problems.

In order to attain the above object, the liquid-transferring hose of the present invention is provided with a pressure-resistant cord layer outside of an internal rubber layer and a cover rubber layer covering the pressure-resistant cord layer, and receives and transmits radio waves of a specific frequency by the aid of a transponder, installed between the inner rubber layer and cover rubber layer, which transmits a response signal on receiving the radio waves of a specific frequency and changes in its transmission characteristics on contacting liquid to be transferred by the hose.

The liquid-transferring hose of the above configuration is equipped with one or more transponders at, e.g., places which tend to suffer liquid leakage. In general, when there is no abnormality, such as cracking or splitting in the internal rubber layer, the above radio waves radiated by a watchman or the like from the outside onto the hose pass through the cover rubber layer and pressure-resistant cord layer to reach the transponder, which transmits a response signal on receiving the waves. Therefore, the watchman can receive the signal from the transponder to confirm that there is no liquid leakage.

On the other hand, when liquid flowing in the hose under pressure leaks out on account of abnormality, e.g., cracking of the internal rubber layer, the leaked liquid will come into contact with the transponder, with the result that it changes in its wave transmission characteristics and cannot respond to the waves radiated by a watchman. This signals that there is liquid leakage around the transponder in question.

The present invention provides a liquid-transferring hose, equipped with one or more transponders, of a single-carcass structure provided with a pressure-resistant cord layer outside of an internal rubber layer and a cover rubber layer covering the pressure-resistant cord layer.

Furthermore, the present invention also provides a liquid-transferring hose of single-carcass structure which is provided with a liquid-flooding and soaking layer between a pressure-resistant cord layer and cover rubber layer, where the transponder is arranged in the liquid-flooding and soaking layer so as to detect liquid leakage in an early stage.

Use of such a liquid-flooding and soaking layer allows liquid leaking out of the inner rubber layer while it is being transferred, on account of, e.g., cracking of the layer, to infiltrate therein and cover the transponder. This design expands a detectable range of a transponder by adequately setting, e.g., area of the liquid-flooding and soaking layer and easiness of liquid infiltration.

The present invention also provides a liquid-transferring hose of double-carcass structure, which is provided with a main pressure-resistant cord layer covering an internal rubber layer, auxiliary pressure-resistant cord layer outside of the main pressure-resistant cord layer, liquid-holding buffer layer between the main pressure-resistant cord layer and auxiliary pressure-resistant cord layer to hold liquid leaking out of the main pressure-resistant cord layer, a cover rubber layer covering the auxiliary pressure-resistant cord layer, and a transponder arranged in the liquid-holding buffer layer.

The above structure with a transponder arranged in the liquid-holding buffer layer allows liquid leaking out of the inner rubber layer while it is being transferred, on account of, e.g., cracking of the layer, to flow into and fill the buffer layer, and to cover the transponder. As a result, since the transponder is coated by leaking liquid filled in the liquid-holding buffer layer, a single transponder can detect initial leakage.

The present invention also provides a transponder covered with a material, e.g., non-woven fabric, in which liquid to be easily transferred infiltrates, so as to allow the transponder to securely change in its wave transmission characteristics, should liquid leakage occur.

The present invention also provides a transponder embedded in the hose near its edge, where liquid leakage tends to occur more frequently, so as to allow the transponder to detect liquid leakage in an early stage.

This invention also provides an adhesion-inhibiting material between the transponder and rubber layer, so as to prevent the transponder and rubber layer from adhering to each other, and thereby to prevent decrease in contact area between the transponder and leaked liquid.

The present invention also sets frequency of the radio waves, to be transmitted and received by the transponder, at a level at which the waves are attenuated to a specified extent or more while passing through liquid being transferred, so as to help change their transmission characteristics. As a result, the response signal waves, transmitted from the transponder in contact with leaked liquid, are sufficiently attenuated not to be received by a watchman.

The present invention also configurates the transponder in such a way that resonant frequency changes at its antenna, when it is in contact with liquid to be transferred.

Changed frequency at the transponder antenna will collapse adjusted conditions between the antenna and high-frequency circuit, degrading wave-receiving sensitivity of the transponder and strength of the waves transmitted by the transponder. This decreases the communicable range with the transponder, making it more difficult for a watchman to receive the response signal waves from the transponder.

Furthermore, according to this invention there is positioned a second transponder near the above described transponder, and the second transponder transmits and receives the radio wave of the predetermined frequency even if the antenna is in contact with liquid to be transferred.

Thereby the embedded location can be specified by accessing the second transponder, even when the location where the transponder for detection is embedded is missed.

DETAILED DESCRIPTION OF THE PRESENT INVENTION

The present invention is described in more detail by referring to the attached drawings.

Figure 1:
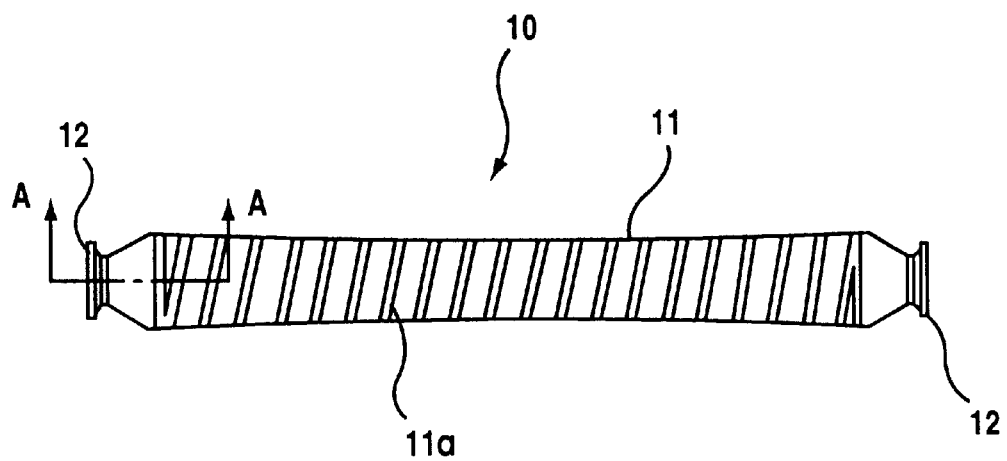
FIG. 1 is an external view of the liquid-transferring hose of single-carcass configuration as a first embodiment of the present invention.
Figure 2:
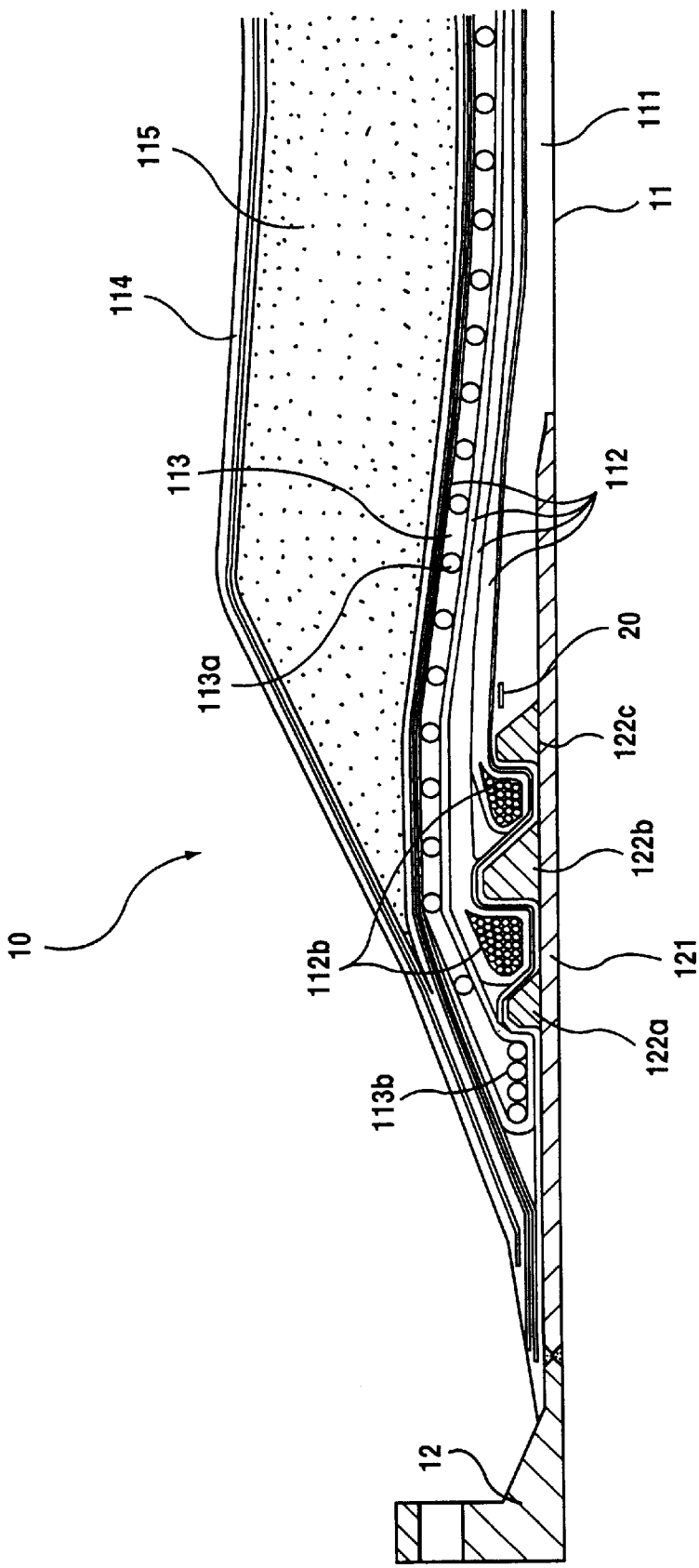
FIG. 2 is a sectional view from the arrowed section A—A shown in FIG. 1.

FIG. 1 is the external view of the liquid-transferring hose of single-carcass structure as the first embodiment of the present invention, and FIG. 2 is a sectional view from the arrowed section A—A shown in FIG. 1, where the liquid-transferring hose (hereinafter referred to as the hose), marked with 10, is of single-carcass structure, and composed of the hose body 11 and flanges 12. These flanges 12 are provided at both ends of the hose body 11, in order to connect a plurality of the hoses 10 to each other.

The hose body 11 has the rubber tube layer 111 (inner rubber layer) of acrylonitrile/butadiene rubber (NBR) or the like as the innermost layer, over which the main pressure-resistant cord layer 112 is provided to hold liquid, such as oil, flowing in the hose 10.

The intermediate rubber layer 113 of styrene/butadiene rubber (SBR) or the like, in which the body wire 113a is embedded, is provided outside of the main pressure-resistant cord layer 112, and the cover rubber layer 114 of SBR or the like is provided to cover the hose body 11, where these layers form a monolithic assembly.

The orange stripe 11a, orange in color, is drawn spirally over the surface of the cover rubber layer 114, or the external surface of the hose body 11.

The expandable floater 115 is provided inside of the cover rubber layer 114, to help the hose easily float on water, e.g., seawater.

Figure 3:
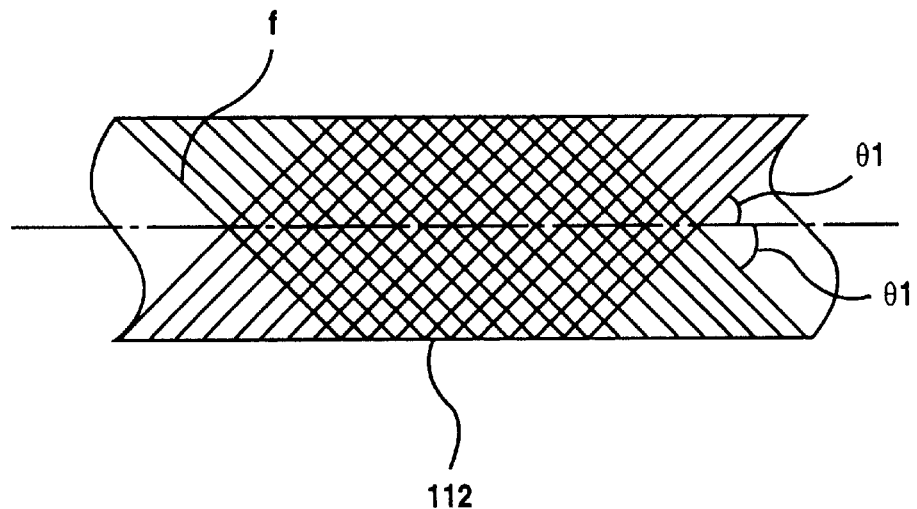
FIG. 3 describes the configuration of the first embodiment of the main pressure-resistant cord layer of the present invention.

Referring to FIG. 3, the main pressure-resistant cord layer 112 has a plurality of cord layers, each of which is composed of the cord (f) arranged with a gradient to the longitudinal direction of the hose body 11. The cord (f) is made of twisted nylon, polyester, rayon or aromatic polyamide fibers, steel wires, or the like. The cord layers are laid one on another in such a way that the cords (f), arranged at varying angle $\theta_1$ to the longitudinal direction of the hose, cross each other, where each hose has the same number of cord layers.

The cord (f) is arranged at an angle $\theta_1$ in a range of $30°<\theta_1<60°$, preferably $35°<\theta_1<55°$. Flexibility of the hose body 11 is insufficient at a cord (f) angle $\theta_1$ below 30°, whereas it is excessive to make the hose difficult to handle at $\theta_1$ of 60° or more. The cord (f) is preferably arranged at $35°<\theta_1<55°$, because of flexibility of the hose body 11 and efficiency of number of the cord layers laid one on another to secure a pressure-resistant strength.

The flange 12 is provided with the ring sections 122*a*, 122*b* and 122*c* as the integral members in the circumferential direction on the external surface of the cylindrical section 121, to attach the flange 12 to the hose body 11.

The flange 12 is securely attached to the hose body 11 at each end section by the clamping wires 112*b* and 113*b*, running around the cylindrical section 121 of the flange 12 and held by the ring sections 122*a*, 122*b* and 122*c*. The layers that constitute the hose body 11 are bonded to the hose body 11 at their ends. The clamping wires 112*b* and 113*b* are provided at the ends of the asymmetrical cord layers for the main pressure-resistant cord layer 112 and intermediate rubber layer 113. The transponder 20 is provided at the end section of the rubber tube layer 111.

This embodiment of the present invention provides two transponders 20 near the flange 12 at each end of the hose 10, to facilitate the hose inspection and other works by a watchman.

The hose 10 is generally designed in such a way that the exposed and submerged sections are automatically determined from structure of the flange 12, when it is connected to another hose 10 and floated on water. However, the hoses 10 may be connected to each other upside down. Therefore, this embodiment of the present invention provides the transponder 20 one by one at upper and lower sections at each end of the hose 10, to facilitate access to the transponder 20.

Figure 4:
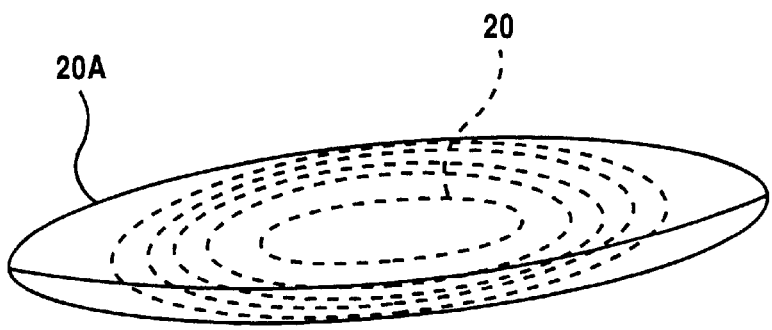
FIG. 4 is an external view of the transponder for the first embodiment of the present invention.

Referring to FIG. 4 which shows the external view of the transponder 20, it is molded in a button-shaped ceramic cage 20A, approximately 4 cm in diameter.

Figure 5:
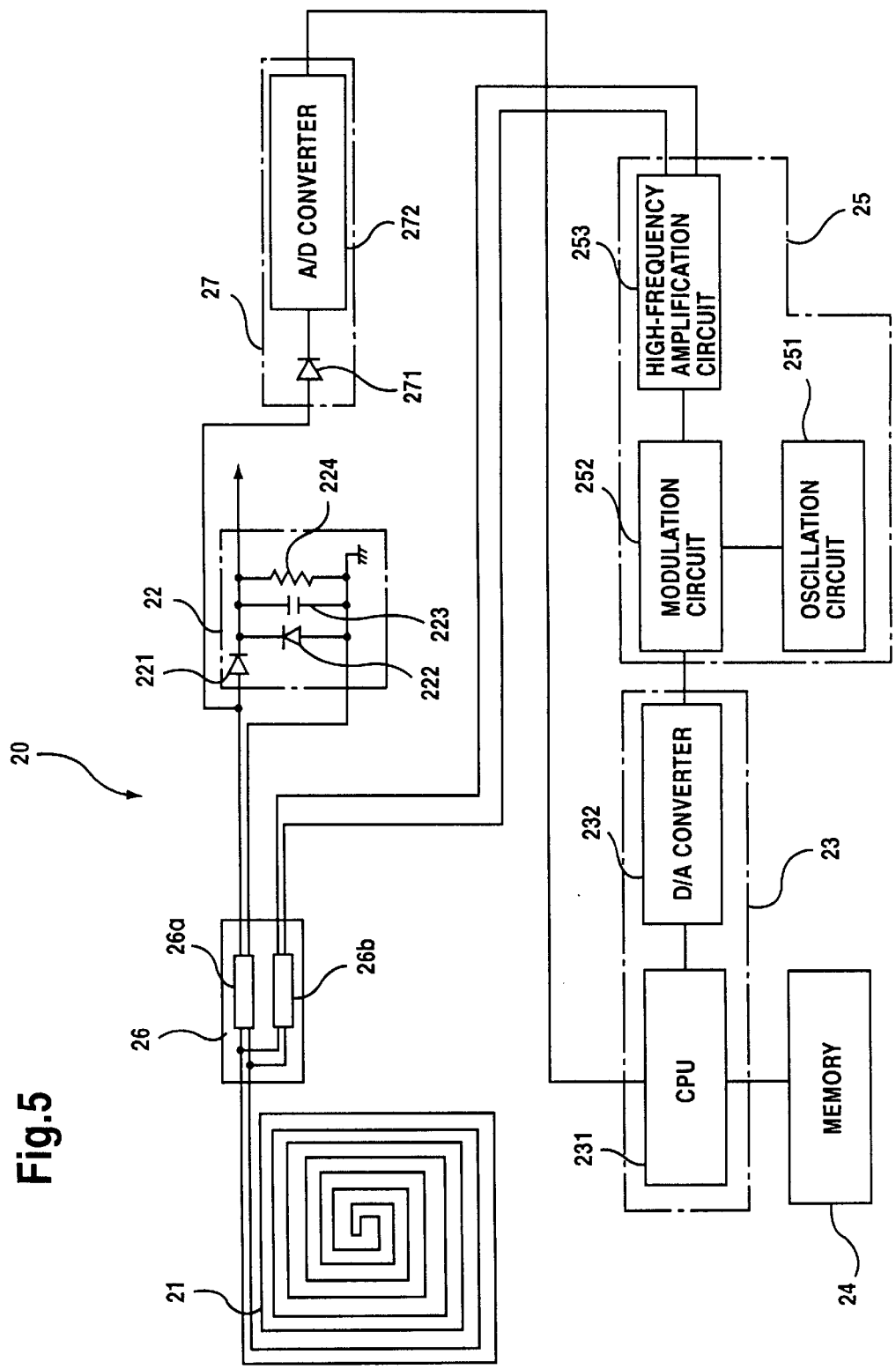
FIG. 5 is an electrical circuit for the transponder for the first embodiment of the present invention.

Referring to FIG. 5, the transponder 20 is composed of the wave transmitting/receiving antenna 21, rectification circuit 22, central processing unit 23, memory 24, transmitting section 25, antenna switch 26 and detector 27.

The rectification circuit 22 is composed of the diodes 221 and 222, condenser 223 and resistor 224, which constitute the full-wave rectification circuit of known structure. The wave transmitting/receiving antenna 21 is connected to the inlet side of the rectification circuit 22 via the antenna switch 26. The rectification circuit 22 rectifies high-frequency current induced on the wave transmitting/receiving antenna 21 into direct current, which is outputted as the power sources for the central processing unit 23, memory 24 and transmitting section 25.

The central processing unit 23 is composed of the CPU 231 and digital/analog (D/A) converter 232 of known structures. The CPU 231 reads out the data stored in the memory 24, composed of a semiconductor memory such as EEPROM driven when the power source is switched on, and transmits them to the transmitting section 25 via the D/A converter 232.

The transmitting section 25 is composed of the transmission circuit 251, modulation circuit 252 and high-frequency amplification circuit 253, where the modulation circuit 252 modulates, based on the signal from the central processing unit 23, the carrier waves (e.g., those of 2 GHz) from the oscillation circuit 251, the modulated waves being sent to the wave transmitting/receiving antenna 21 via the high-frequency amplification circuit 253 and antenna switch 26.

The antenna switch 26, composed of, e.g., an electronic switch, connects the wave transmitting/receiving antenna 21 to the rectification circuit 22 or high-frequency amplification circuit 253, and is switched by on the control signal from the CPU 231.

The antenna switch 26 connects the wave transmitting/receiving antenna 21 to the rectification circuit 22 while the CPU 231 is out of service, and to the high-frequency amplification circuit 253 while the CPU 231 is in service.

The detector 27 is composed of the diode 271 and A/D converter 272, the anode of the former being connected to the wave transmitting/receiving antenna 21 whereas the cathode to the CPU 231 for the central processing unit 23 via the A/D converter.

Next, the scanner for the first embodiment of the present invention is described. It is a device responsible for accessing the transponder 20 for information.

The scanner for the first embodiment of the present invention radiates electromagnetic waves of 2 GHz in frequency to the transponder 20 for a given time, and judges working conditions of the transponder 20 whether or not it receives the electromagnetic waves as the response signal sent back from the transponder 20. It judges that liquid leaks out when it receives no signal within a given time, and displays the result, as described later in more detail.

Figure 6:
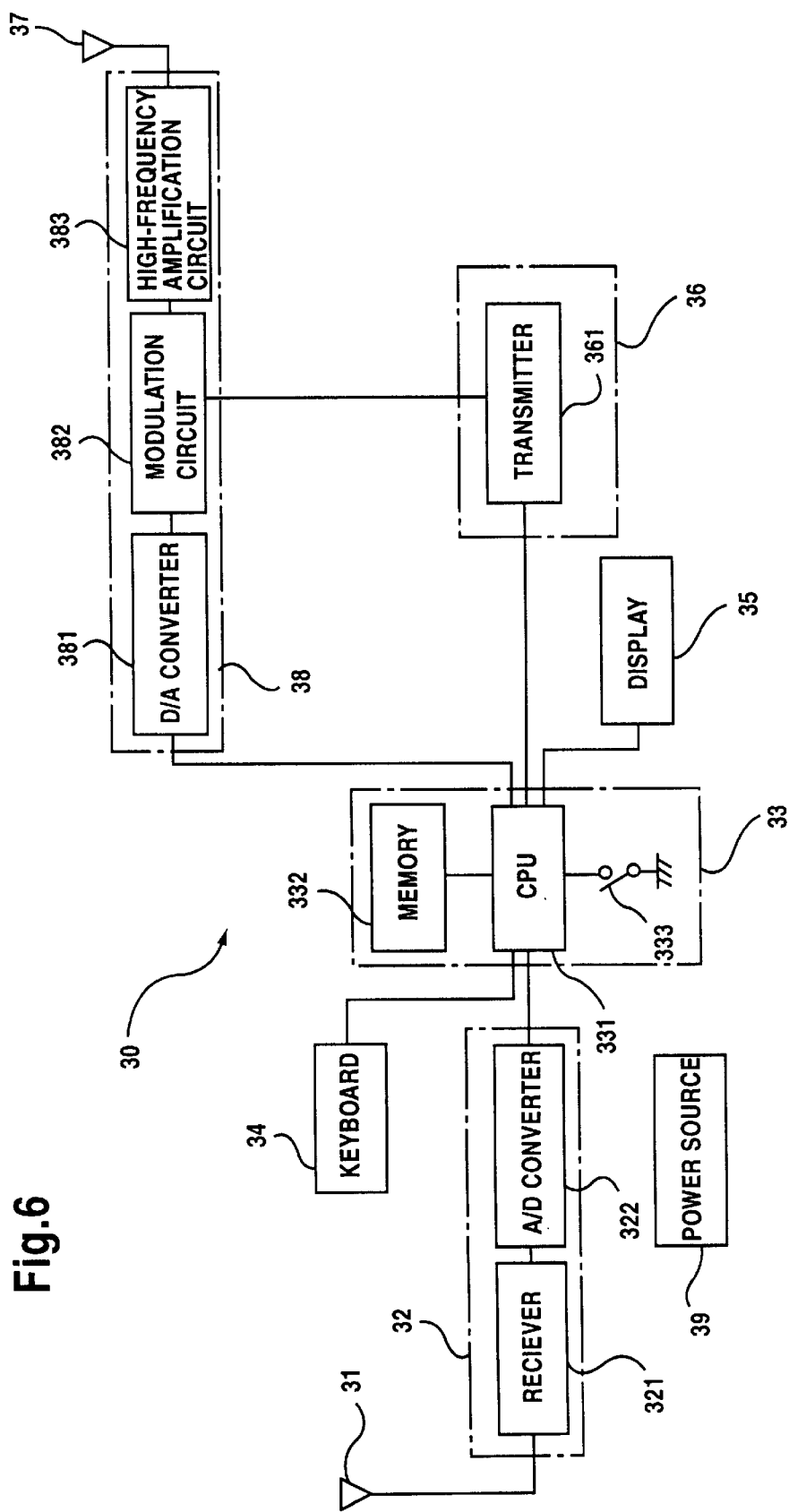
FIG. 6 is an electrical circuit for the scanner for the first embodiment of the present invention.

The scanner is described in more detail by referring to FIG. 6, which shows the block diagram of the electrical circuit for accessing the transponder 20 for information. The electrical circuit is composed of the scanner 30, receiving antenna 31, receiving section 32, central processing unit 33, keyboard 34, display 35, transmitting section 36, transmitting antenna 37, modulation section 38 and power source 39 which supplies power to these devices.

The receiving section 32 is composed of the receiver 321 and analog/digital (A/D) converter 322. The receiver 321 receives high-frequency waves of 2 GHz from the receiving antenna 31, to which its inlet side is connected, detects them, and sends them to the central processing unit 33 via the A/D converter 322.

The central processing unit 33 is composed of the CPU 331, memory 332 and switch 333 of known structures. The CPU 331 stores, in the memory 332, information sent from the receiving section 32, based on the instruction sent from the keyboard 34, and displays it on the display 35. In addition, the CPU 331 sends transmission control signal to the transmitting section 36, while the switch 333 is on.

The transmitting section 36 is composed of the transmitter 361, which sends the carrier waves of 2 GHz to the modulation section 38, while it is receiving the transmission control signal from the CPU 331.

The modulation section 38 is composed of the D/A converter 381, modulation circuit 382, and high-frequency amplification circuit 383, the inlet side of the D/A converter 381 being connected to the CPU 331 for the central processing unit 33 whereas the outlet side to the modulation circuit 382. The modulation circuit 382 receives the carrier waves from the transmitting section 36, modulates them, and sends the modulated waves to the high-frequency amplification circuit 383. The amplified high-frequency signal is sent to the transmitting antenna 37 by the high-frequency amplification circuit 383.

Figure 7:
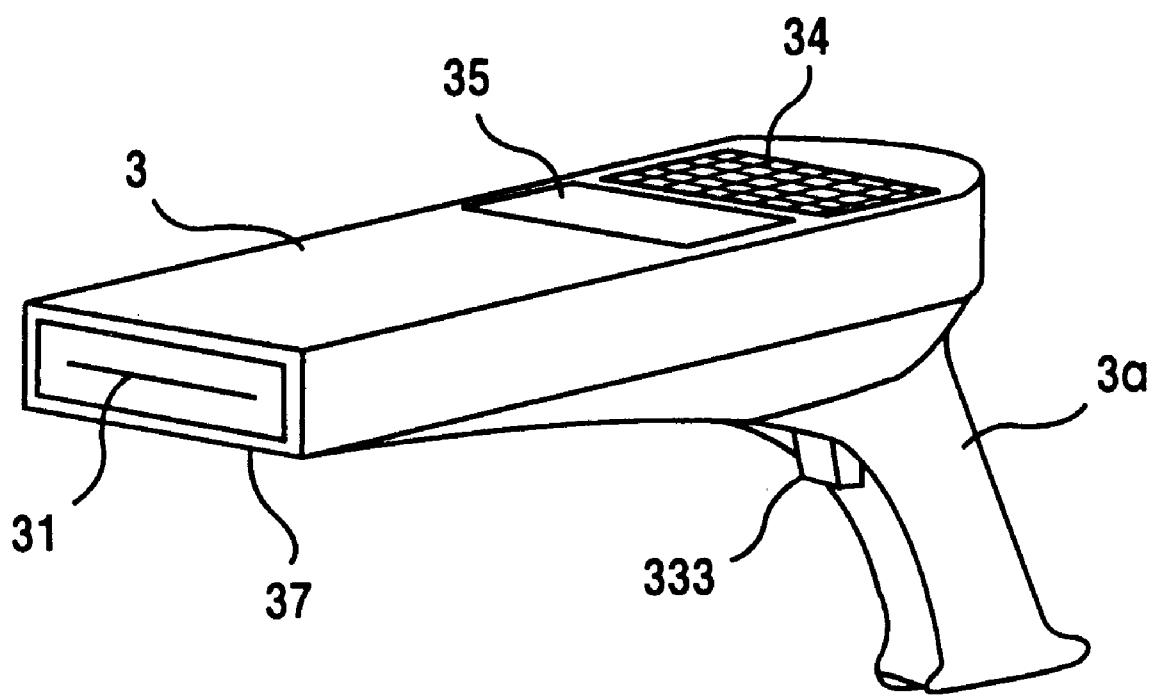
FIG. 7 is an external view of the scanner for the first embodiment of the present invention.

The scanner 30 is encased in the pistol-shaped cage 3, as shown in FIG. 7. The receiving antenna 31 and transmitting antenna 37 are provided at the edge of the cage 3, and the keyboard 34 and display 35 on the cage 3. The switch 333 is provided at the trigger in front of the grip 3*a*.

Frequency of the waves flowing between the transponder 20 and scanner 30 in the above configuration is set at 2 GHz for the following reasons. The waves of 2 GHz can pass through the members of the hose 10 to reach the transponder 20, when there is no leakage. As a result, the transponder 20 can receive the waves, and send the response signal back to outside of the hose 10.

The high-frequency waves of 2 GHz pass through the hose 10 members (the rubber tube layer 111, main pressure-resistant cord layer 112, intermediate rubber layer 113 and cover rubber layer 114) undergoing practically no attenuation. This enables the scanner 30 to access the transponder 20 (1 m or so apart), when the scanner transmits high-frequency waves of at least 15 mW.

Figure 8:
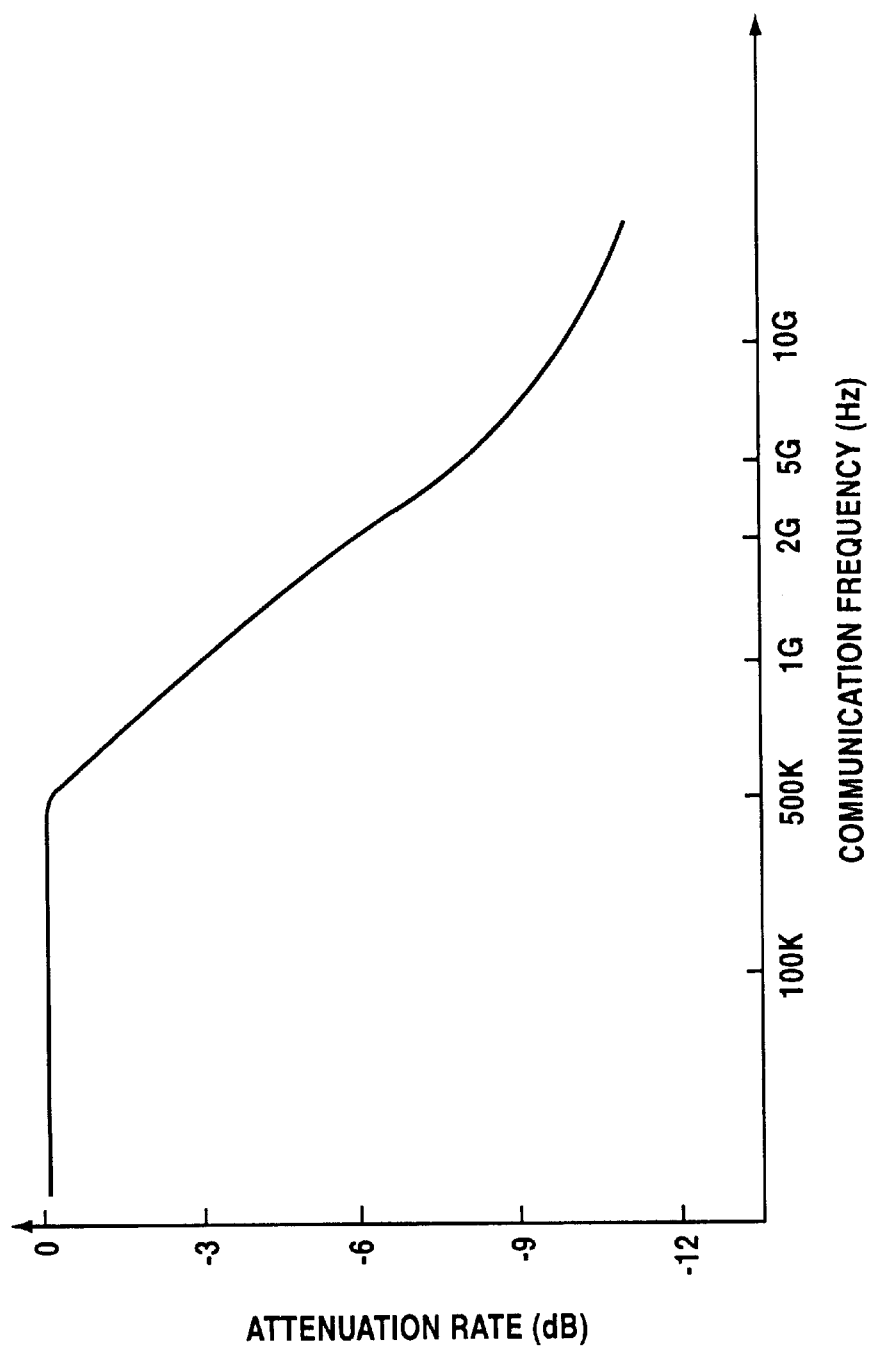
FIG. 8 is a frequency characteristic curve for the present invention, showing high-frequency attenuation rate with fuel oil.

When the transponder 20 is covered with liquid (here, fuel oil) being transferred by the hose 10, the waves of 2 GHz (the high-frequency waves) will be attenuated by at least −6 dB while passing through the liquid layer as shown in FIG. 8, which plots attenuation rate (ordinate) against communication frequency (abscissa) for fuel oil as the liquid.

Thereby, when the transponder 20 is covered with leaked liquid, the waves radiated from the scanner 30 are attenuated by liquid. That is, even if the waves reach or don't reach the transponder 20, the waves become so weak not as to supply any energy enough to drive the transponder 20. Or, even if any drive energy can be supplied to the transponder 20, the response signal from the transponder 20 is attenuated by liquid and cannot be radiated to the outer part of the hose 10, and consequently, any response signal cannot be received by the scanner 30. These are the reasons for setting wave frequency at 2 GHz.

It should be noted, however, that frequency of 2 GHz is mere one example. It is preferable that an adequate frequency is adopted for a specific type of liquid to be transferred, to cause the wave to be attenuated by at least −4 dB, preferably at least −6 dB, when it passes through a liquid layer.

The first embodiment of the present invention, of the above design, allows the waves radiated by a watchman or the like from the outside of the hose 10 using the scanner 30 to reach the transponder 20, after passing through the cover rubber layer 114 and main pressure-resistant cord layer 112, which will send back the response signal on receiving the waves, barring an abnormality, such as exfoliation, cracking or splitting between the rubber tube layer 111 and cylindrical section 121. The watchman can confirm that there is no leakage of liquid, when he receives the response signal from the transponder 20.

More concretely, a watchman turns the switch 333 on while directing the scanner 30 towards the transponder 20 embedded in the hose 10, in order to inspect conditions of the hose 10.

This sends the high-frequency waves (inquiring signal) from the transmission section 36 for the scanner 30 to the transmitting antenna 37, which radiates electromagnetic waves of 2 GHz in frequency, requesting the response signal from the transponder 20. The electromagnetic waves are received by the transmitting/receiving antenna 21 for the transponder 20, to induce high-frequency current therein.

The high-frequency current induced in the transmitting/receiving antenna 21 is rectified by the rectification circuit 22, and supplied to the central processing unit 23, memory 24 and transmission section 25 in the transponder 20 as driving power.

As a result, the CPU 231 is turned on, switching the antenna switch 26 to the condition that it is ready for transmitting the waves. The CPU 231 reads out information stored in the memory 24, in accordance with the predetermined program, to send it to the transmitting section 25.

The transmitting section 25 modulates the carrier waves, based on the read-out information, the modulated carrier waves being sent to the transmitting/receiving antenna 21 as the high-frequency signal. On receiving the high-frequency signal, the antenna 21 radiates back the electromagnetic waves of 2 GHz in frequency as the response signal.

The scanner 30 receives the electromagnetic waves of 2 GHz (inquiring signal) in frequency as the response signal, radiated back from the transponder 20, by the transmitting/receiving antenna 31 for the receiving section 32, which converts the data it receives into the digital data to be sent to the central processing unit 33.

The central processing unit 33 instructs the display 33, based on the digital data it receives, to show that there is no liquid leakage around the transponder 20.

The transponder 20 is generally provided at the edge section of the rubber tube layer 111, where liquid leakage tends to occur more frequently, and will be covered by liquid, when it leaks out on account of abnormality, e.g., cracking of the rubber tube layer 111, while the hose 10 is transferring the liquid under pressure. In such a case, the scanner 30 cannot receive the response signal from the transponder 20 for a given time after a watchman radiates the waves from the scanner 30, and instructs its display 35 to tell the watchman that there is liquid leakage, as described earlier.

The first embodiment of the present invention provides a liquid-transferring hose 10 of single-carcass structure, which easily detects liquid leakage during the initial stage, because the transponder 20 will be covered with liquid, when it leaks out while being transferred under pressure by the hose 10, causing attenuation of the waves of a given frequency the transponder 20 receives and transmits, as a result of which a watchman cannot detect the response signal from the transponder 20.

Position of the transponder 20 is not limited. The similar effects can be secured when it is provided at other positions where liquid leakage tends to occur.

Next, the second embodiment of the present invention is described.

Figure 9:
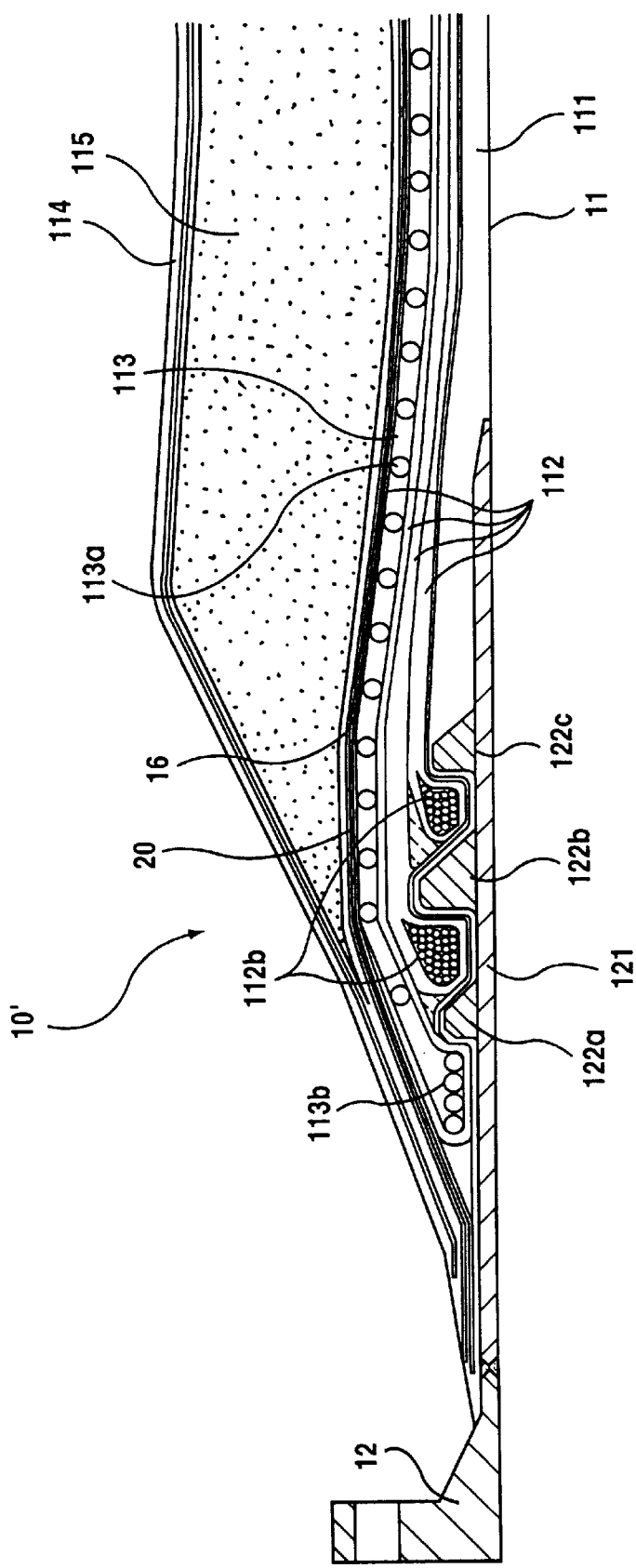
FIG. 9 outlines the section of the hose as a second embodiment of the present invention.

FIG. 9 outlines the section of the hose 10' as a second embodiment of the present invention. This corresponds to FIG. 2 described earlier, and the hose members having similar structures are marked with the same numbers and omitted from description. The second embodiment differs from the first embodiment in that the former is provided with the liquid-flooding and soaking layer 116 continuously extending in the whole section between the main pressure-resistant cord layer (pressure-resistant cord layer) 112 and cover rubber layer 114 for the first embodiment, and that the transponder 20 is provided in the liquid-flooding and soaking layer 116.

The second embodiment of the present invention provides, as is the case with the first embodiment, the transponders two by two near the flange 12 at each end of the hose 10', to facilitate the hose inspection and other works by a watchman.

The hose 10' is generally designed in such a way that the exposed and submerged sections are automatically determined from structure of the flange 12, when it is connected to another hose 10' and floated on water. However, the hoses 10' may be connected to each other upside down. Therefore, this embodiment of the present invention provides the transponder 20 one by one at upper and lower sections at each end of the hose 10', to facilitate access to the transponder 20.

The liquid-flooding and soaking layer 116 is made of a material in which liquid to be transferred easily infiltrates, e.g., foam with continuous pores, and the floater 115 is provided outside of the liquid-flooding and soaking layer 116.

The second embodiment of the present invention provides a liquid-transferring hose 10' of single-carcass structure, which easily detects liquid leakage during the initial stage, because the transponder 20 will be covered with liquid, when it leaks out to infiltrate into the liquid-flooding and soaking layer 116 from the rubber tube layer 111 on account of abnormality, e.g., cracking in the rubber tube layer 111 (inner rubber layer), causing attenuation of the waves of a given frequency the transponder 20 receives and transmits, as a result of which a watchman cannot detect the response signal from the transponder 20.

Leaked liquid infiltrating into the liquid-flooding and soaking layer 116 extends further in the layer than in the hose of the first embodiment, expanding a detectable range of one transponder 20, by which is meant that the leakage occurring beyond the detectable range in the first embodiment may be detected.

The liquid-flooding and soaking layer 116 is provided for the entire length of the hose in the second embodiment. Other designs are also possible; e.g., a plurality of the liquid-flooding and soaking layers 116 having a given area are provided in one hose, with the transponder 20 being placed in each of them.

One transponder 20 placed in the liquid-flooding and soaking layer 116 can have an extended detectable range by adequately setting area, thickness and easiness of liquid infiltration of the liquid-flooding and soaking layer 116.

Next, the third embodiment of the present invention is described.

Figure 10:
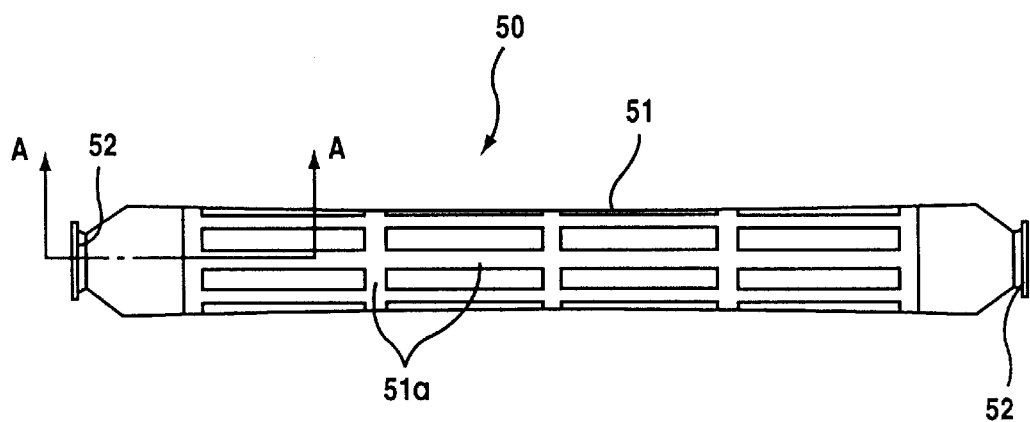
FIG. 10 is the liquid-transferring hose of double-carcass structure as a third embodiment of the present invention.
Figure 11:
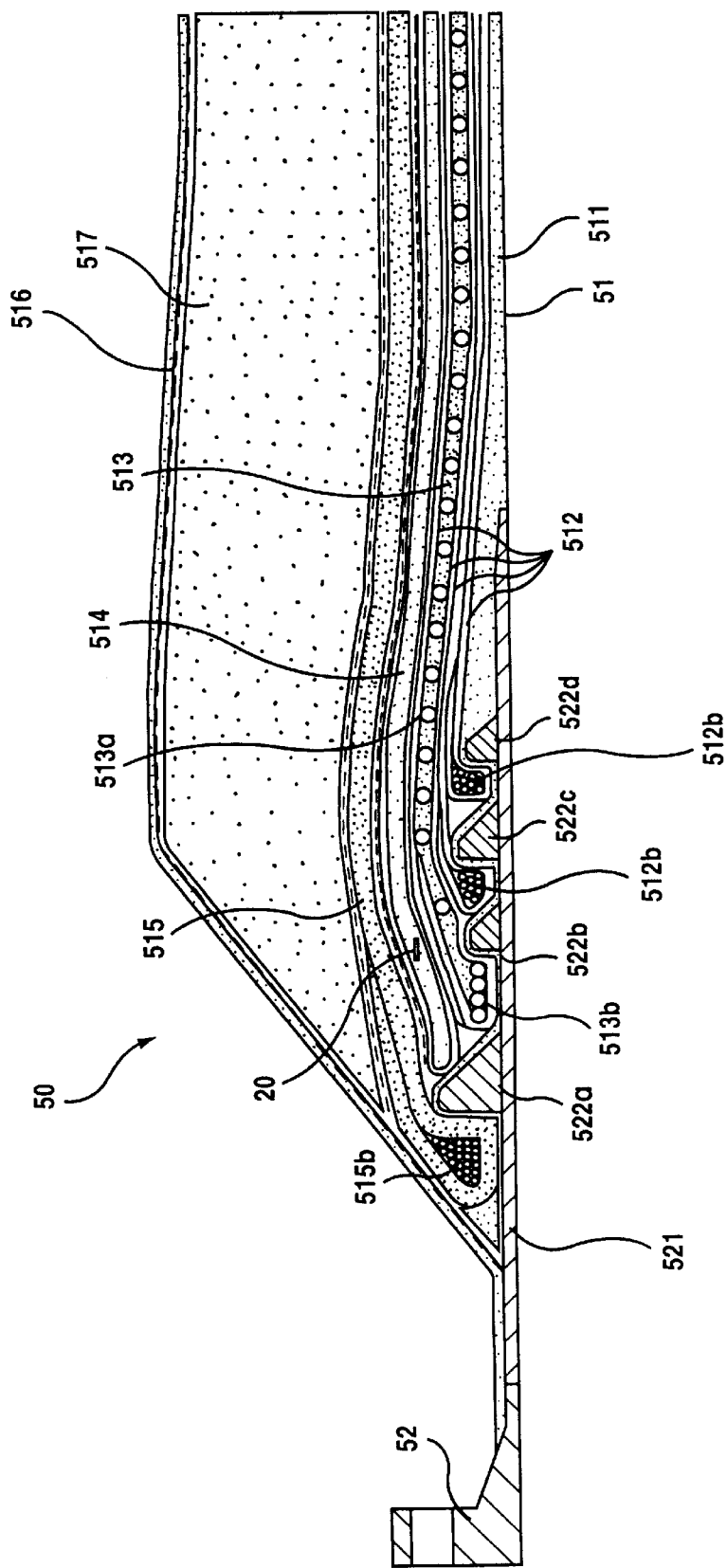
FIG. 11 is a sectional view from the arrowed section A—A shown in FIG. 10.

FIG. 10 is the external view of the liquid-transferring hose (hereinafter referred to as hose) as the third embodiment of the present invention, and FIG. 11 is a sectional view from the arrowed section A—A shown in FIG. 10, where the hose 50 is of double-carcass structure, and composed of the hose body 51 and flanges 52, provided at both ends of the hose body 51, in order to connect a plurality of the hoses 50 to each other.

The hose body 11 has the rubber tube layer 511 (inner rubber layer) of acrylonitrile/butadiene rubber (NBR) or the like as the innermost layer, over which the main pressure-resistant cord layer 512 is provided to hold liquid, such as oil, flowing in the hose 50. The main pressure-resistant cord layer 512 is covered by the intermediate rubber layer 513 of SBR or the like, in which the body wire 513a is embedded, and also with the liquid-holding buffer layer 514, in this order.

The liquid-holding buffer layer 514 holds liquid leaking out on account of abnormality, e.g., splitting in the rubber tube layer 511, main pressure-resistant cord layer 512 and intermediate rubber layer 513, and is made of a material (e.g., foam with continuous pores) which well absorbs liquid present in the closed space formed by the auxiliary pressure-resistant cord layer 515 outside of the liquid-holding buffer layer 514 and intermediate rubber layer 513.

The cover rubber layer 518 of styrene/butadiene rubber (SBR) or the like is provided outside of the auxiliary pressure-resistant cord layer 515, to totally cover the hose body 51 and thereby to form a monolithic assembly.

The orange stripe 51a, orange in color, is drawn in lattice over the surface of the cover rubber layer 516, or the external surface of the hose body 51.

The expandable floater 517 is provided inside of the cover rubber layer 516 between it and the auxiliary pressure-resistant cord layer 515, to help the hose easily float on water, e.g., seawater.

The flange 52 is provided with the ring sections 522a, 522b, 522c and 522d as the integral members in the circumferential direction on the external surface of the cylindrical section 521, to attach the flange 52 to the hose body 51.

The flange 52 is securely attached to the hose body 51 at each end section by the clamping wires 512b, 513b and 515b, held by the ring sections 522a, 522b, 522c and 522d. The layers that constitute the hose body 51 are bonded to the hose body 51 at their ends. The clamping wires 512b, 513b and 515b are provided at the ends of the main pressure-resistant cord layer 512, intermediate rubber layer 513 and auxiliary pressure-resistant cord layer 515.

The transponder 20 is provided in the liquid-holding buffer layer 514 near the ring sections 512a to 512d.

This embodiment of the present invention provides the transponders near the flange 52 two by two at each end of the hose 50, to facilitate the hose inspection and other works by a watchman. The hose 50 is generally designed in such a way that the exposed and submerged sections are automatically determined from structure of the flange 52, when it is connected to another hose 50 and floated on water. However, the hoses 50 may be connected to each other upside down. Therefore, this embodiment of the present invention provides the transponder 20 one by one at upper and lower sections at each end of the hose 50, to facilitate access to the transponder 20.

The transponder 20 for this embodiment is similar to those for the first and second embodiments.

In accordance with teaching of the present invention for the liquid-transferring hose 50 of double-carcass structure, described above, when there is no abnormality in the hose 50, a watchman can confirm this by accessing the transponder 20 using the scanner during a regular inspection period.

On the other hand, when liquid leaks out on account of abnormality, e.g., cracking or splitting in the main pressure-resistant cord layer 512 or intermediate rubber layer 513 of the hose 50, it fills the liquid-holding buffer layer 514 to cover the transponder 20 therein. Liquid leakage can be easily detected during the initial stage, because the waves of a given frequency the transponder 20 receives and transmits are attenuated by the liquid infiltrating into the liquid-holding buffer layer 514 while it is being transferred by the hose 50, as a result of which a watchman cannot detect the response signal from the transponder 20.

The transponder 20 placed in the liquid-holding buffer layer 514 will be securely surrounded by liquid, when it leaks out, because it invariably infiltrates into and fills the buffer layer 514, as a result of which liquid leakage is securely and easily detected during the initial stage.

Figure 12:
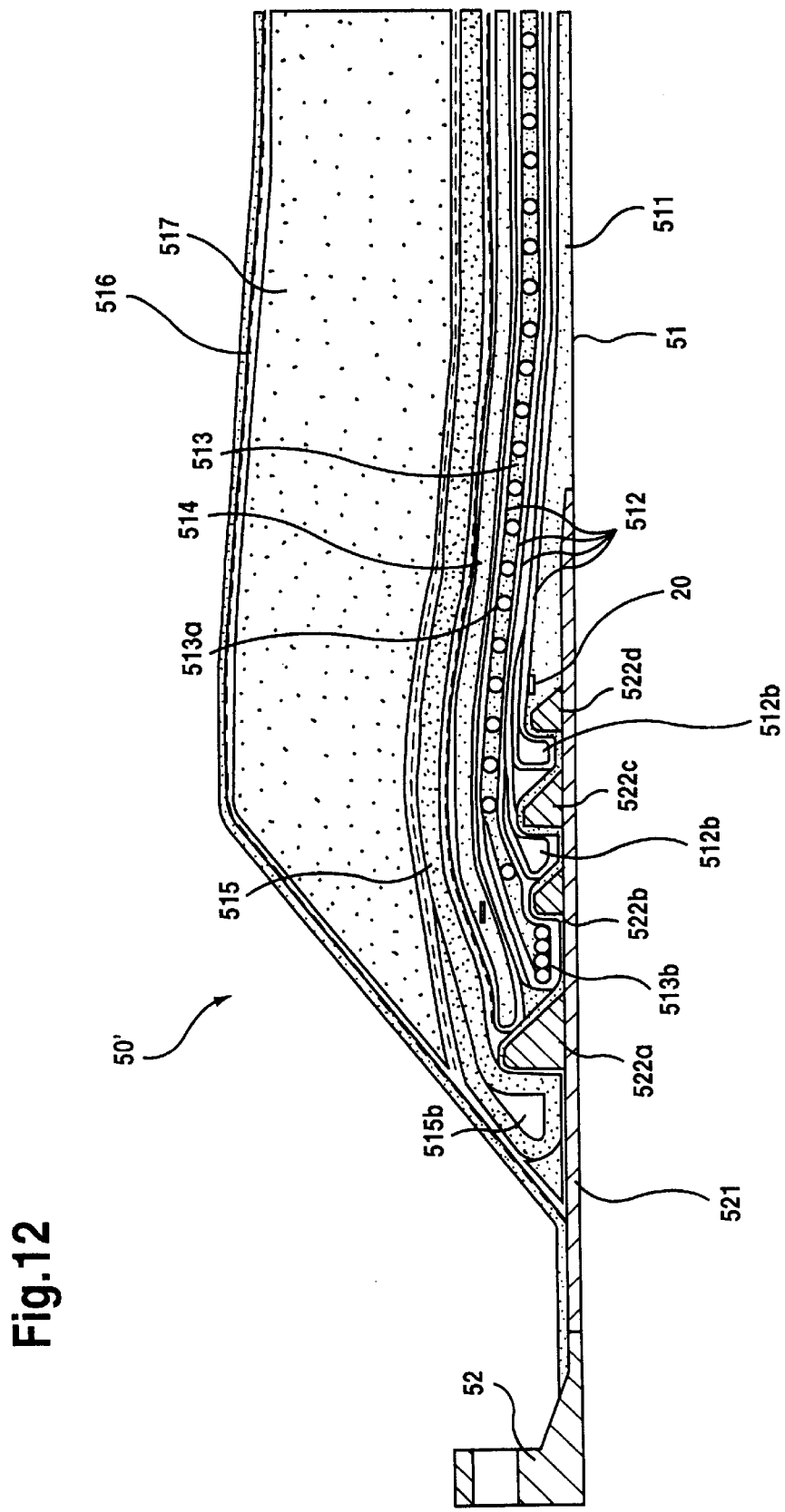
FIG. 12 outlines the section of the hose as a fourth embodiment of the present invention.

The transponder 20 is provided in the liquid-holding buffer layer 514 in the third embodiment. However, it may be provided at other positions where liquid leakage tends to occur. For example, it may be provided near the flange 52 at the end of the hose 50, as shown in FIG. 12 for the fourth embodiment, as is the case with the first embodiment. When transponder 20 is to be provided outside of the liquid-holding buffer layer 514, it must be positioned at each important point.

A total of four transponders 20 are provided in the liquid-holding buffer layer 514 in the third embodiment. However, one transponder can securely detect liquid leakage during the initial stage, so long as it is placed in the liquid-holding buffer layer 514.

Next, the fifth embodiment of the present invention is described.

The fifth embodiment of the present invention uses a transponder, different from the transponder 20 for the first embodiment described earlier in that resonant frequency changes at its antenna when it is in contact with liquid to be transferred. It shares the common features, such as hose 10 structure and transponder position, shown in FIGS. 1 or 3 and 5, with that for the first embodiment except for structure of the transponder itself. Frequency of the waves the transponder of the present embodiment receives and transmits is set, e.g., at a frequency band of 13.56 MHz. The electrical circuit for the transponder is similar to that for the embodiment 1 shown in FIG. 5, except that the scanner transmits to or receives from the transponder the waves whose frequency is set at 13.56 MHz to detect leakage of liquid being transferred.

Figure 13:
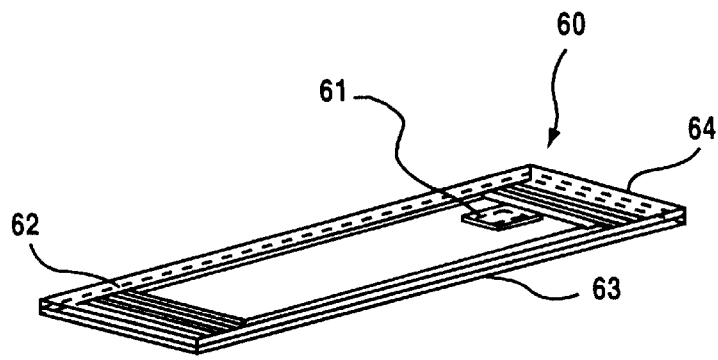
FIG. 13 is an oblique view of the transponder for a fifth embodiment of the present invention.
Figure 14:
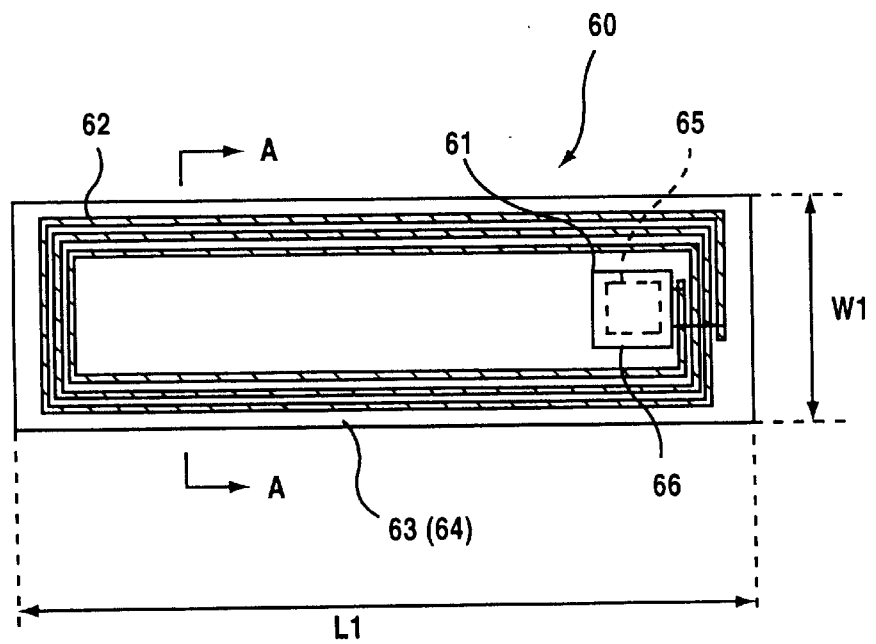
FIG. 14 is a plan view of the transponder for the fifth embodiment of the present invention.
Figure 15:
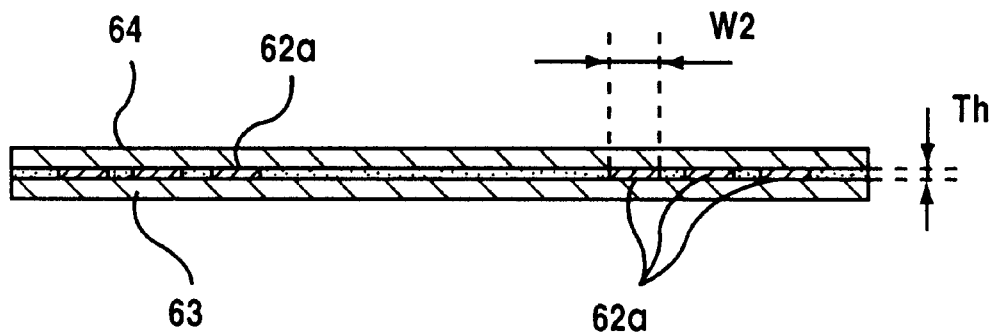
FIG. 15 is the section of the hose shown in FIG. 14, viewed from the arrowed section A—A.

FIGS. 13 and 14 are the oblique and plan views of the transponder for the fifth embodiment of the present invention, and FIG. 15 is the section of the hose shown in FIG. 14, viewed from the arrowed section A—A.

Referring to FIG. 13, the transponder 60 is composed of the transponder element 61 and loop-shaped antenna 62, placed between the films 63 and 64.

The films 63 and 64 are made of, e.g., polyimide film of 30 mm in width (W1) and 100 mm in length (L1), where the antenna 62 is printed on the lower film 63. The transponder element 61 is bonded to the films 63 and 64 by a resin.

The transponder element 61 is composed of the transponder element body 65, composed of semiconductor chips, and rectangular resin package 66 that covers the body 65.

The antenna 62 is composed of coil-shaped conductors 62*a*, printed on the film 63, and set at a thickness (Th) of 20 $\mu$m, width (W2) of 2 mm and length which makes the antenna resonant with the transmitted/received waves of 13.56 MHz in frequency, as shown in FIGS. 14 and 15.

The antenna 62 is so structured as to have a low "Q value" of, e.g., around 10. It is necessary to design an antenna structure of low magnetic flux density, in order to realize the above low "Q value." Therefore, width (W1) of the printed wire conductor 62*a* that constitutes the antenna 62 is set larger than its thickness (Th), to prevent the magnetic flux generated by the antenna 62 from concentrating on one point.

The transponder 60 of the above structure communicates with the scanner in an ordinary manner, unless it is in contact with liquid being transferred.

Figure 16:
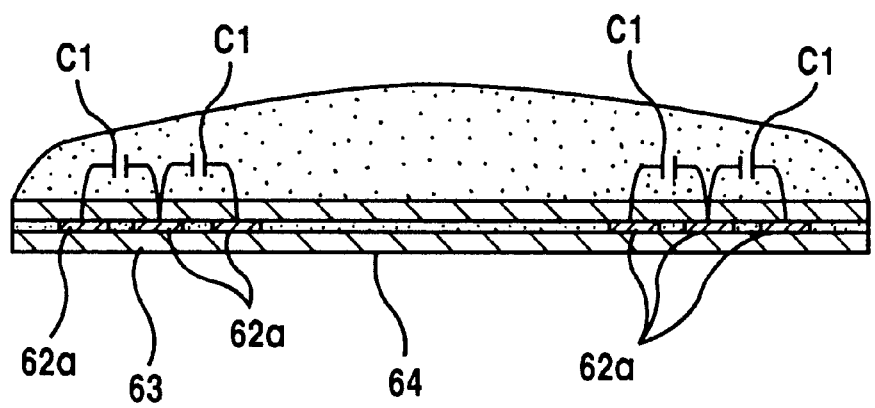
FIG. 16 is a view for describing describes leakage detecting action for the fifth embodiment of the present invention.

When the transponder 60 is in contact with liquid being transferred, on the other hand, an electrostatic capacity C1 is generated by the liquid between the adjacent conductors 62*a* that constitute the antenna 62, to bias resonant frequency at the antenna 62 and frequency of the waves it transmits upward or downward from 13.56 MHz as shown in FIG. 16.

Changed frequency at the antenna 62 will collapse adjusted conditions between it and transmitting section 25, decreasing the communicable range of the waves radiated from the antenna 62 to an extent that the scanner cannot receive the response signal sent from the transponder 60.

The transmitted/received wave frequency of 13.56 MHz and antenna 62 structure described above provide mere examples, and by no means limit those for the present invention. They are determined to change the transmission characteristics (resonant frequency at the antenna) when the transponder is in contact with liquid.

The fifth embodiment of the present invention, of the above design, allows the waves radiated by a watchman or the like from the outside of the hose 10 using the scanner to reach the transponder 60, after passing through the cover rubber layer 114 and main pressure-resistant cord layer 112, which will send back the response signal on receiving the waves, barring an abnormality, such as exfoliation, cracking or splitting between the rubber tube layer 111 and cylindrical section 121. The watchman can confirm that there is no leakage of liquid, when he receives the response signal from the transponder 60.

The transponder 60 is generally provided at the edge section of the rubber tube layer 111, where liquid leakage tends to occur more frequently, and will be covered by liquid, when it leaks out on account of abnormality, e.g., cracking of the rubber tube layer 111, while the hose 10 is transferring the liquid under pressure. In such a case, the scanner cannot receive the response signal from the transponder 60 for a given time after a watchman radiates the waves from the scanner, and instructs its display 35 to tell the watchman that there is liquid leakage, as described earlier.

The fifth embodiment of the present invention provides a liquid-transferring hose 10 of single-carcass structure, which easily detects liquid leakage during the initial stage, because the transponder 60 will be in contact with liquid, when it leaks out, causing attenuation of the waves the transponder 60 transmits, as a result of which a watchman cannot detect the response signal from the transponder 20.

Position of the transponder 60 is not limited. The similar effects can be secured when it is provided at other positions where liquid leakage tends to occur.

Covering the antenna 62 of the transponder 60 with a material, e.g., non-woven fabric, in which liquid to be transferred easily infiltrates, will help the transponder 60 easily detect liquid leakage, because it can be in contact with the liquid even when its quantity is very small.

Resonant frequency at the antenna 62 of the transponder 60 and frequency of the waves it transmits are biased differently, depending on type of liquid it contacts. For example, frequency is biased upward when liquid is fuel oil, and downward when it is water or seawater. It is possible to judge whether liquid being transferred leaks or water flows inward because of damaged outer layer of the hose by knowing direction of the frequency bias.

The polyimide films 63 and 64 as the members of the transponder 60 tend to adhere to the rubber or the like for the hose 10. Adhesion of the film 63 or 64 to a hose member prevents the resonant frequency bias at the antenna 62. An adhesion-preventive film, e.g., that of cellophane, may be placed between a member of the hose 10 and the transponder 60, in order to prevent the above trouble.

The present embodiment takes, as an example, the transponder 60 provided in the hose 10 of single-carcass structure for the first embodiment. However, the similar effects can be obtained when it is provided in the hose 10' with the liquid-flooding and soaking layer for the second embodiment, or in the hose 50 or 50' of double-carcass structure for the third or fourth embodiment.

Next, the sixth embodiment of the present invention is described.

Figure 17:
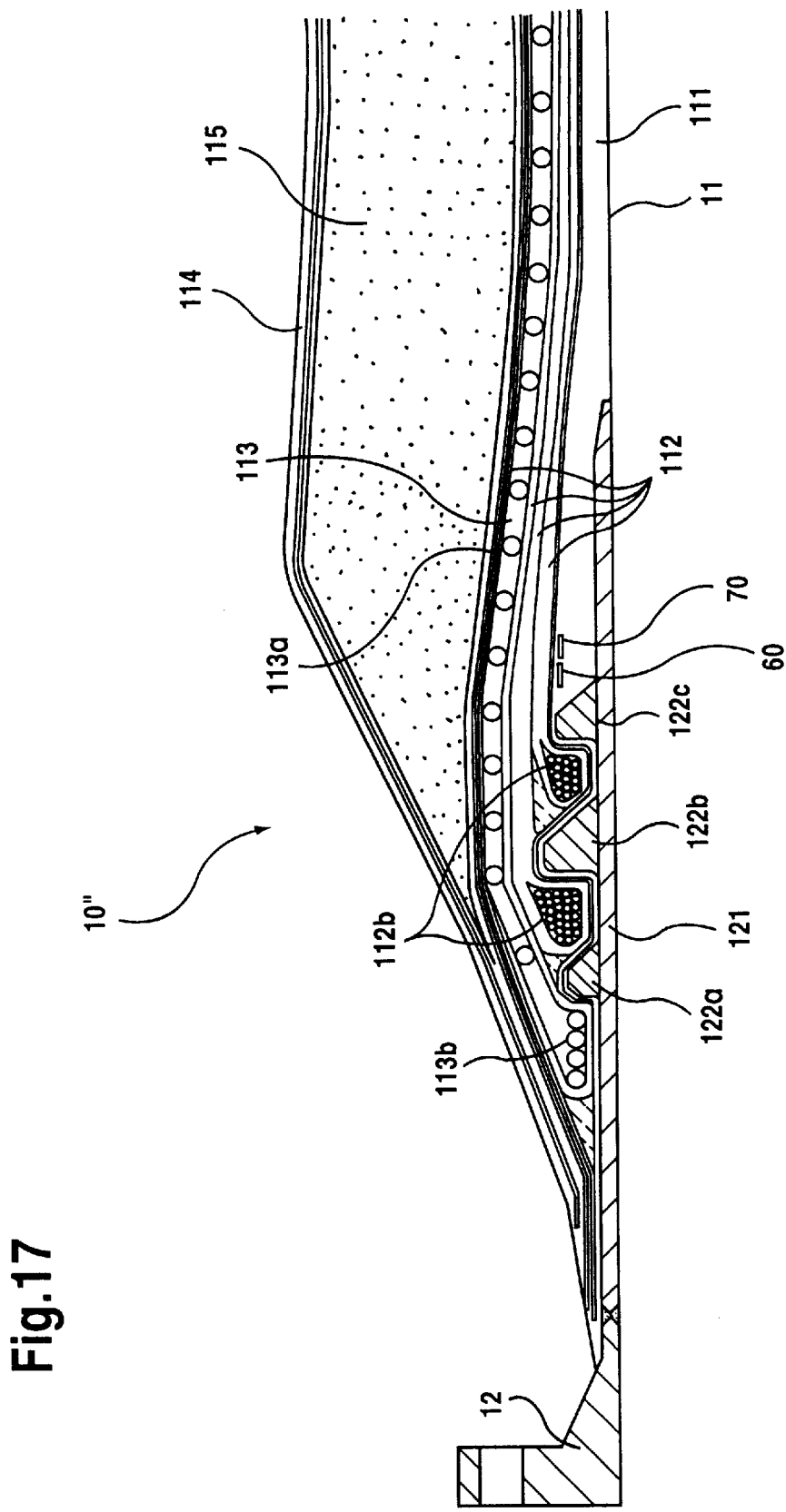
FIG. 17 outlines the section of the hose as a sixth embodiment of the present invention.

FIG. 17 shows the section of the hose as the sixth embodiment of the present invention. As shown in this FIG., the sixth embodiment provides the second transponder 70, in addition to the first one for the fifth embodiment. In other words, two transponders 60 and 70 are embedded in the hose 10" of the sixth embodiment.

Figure 18:
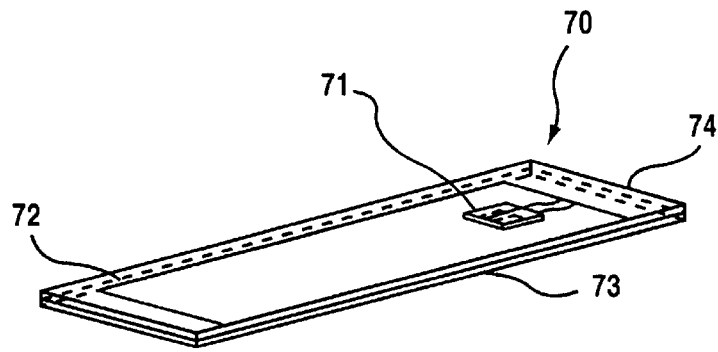
FIG. 18 is an oblique view of the transponder for the sixth embodiment of the present invention.
Figure 19:
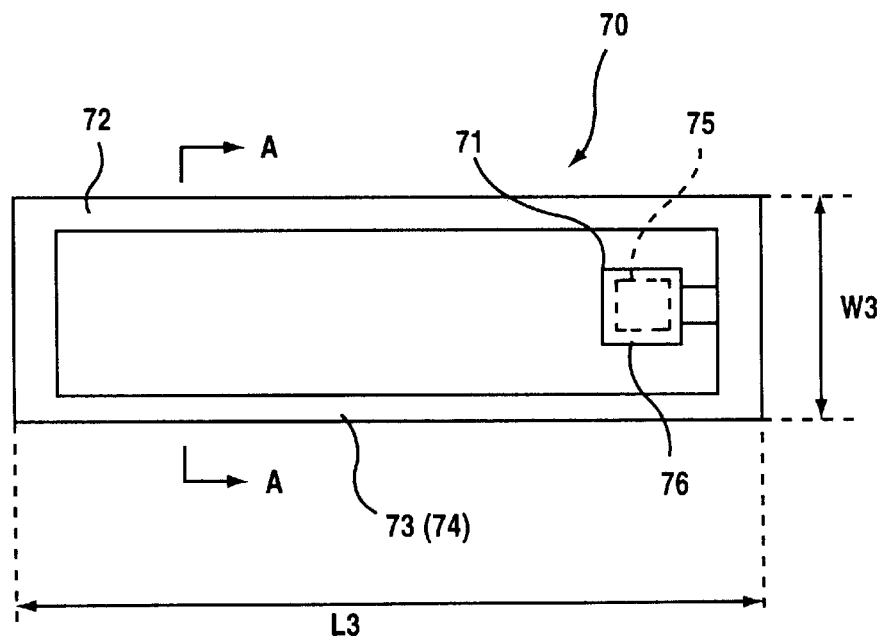
FIG. 19 is a plan view of the transponder for the sixth embodiment of the present invention.
Figure 20:
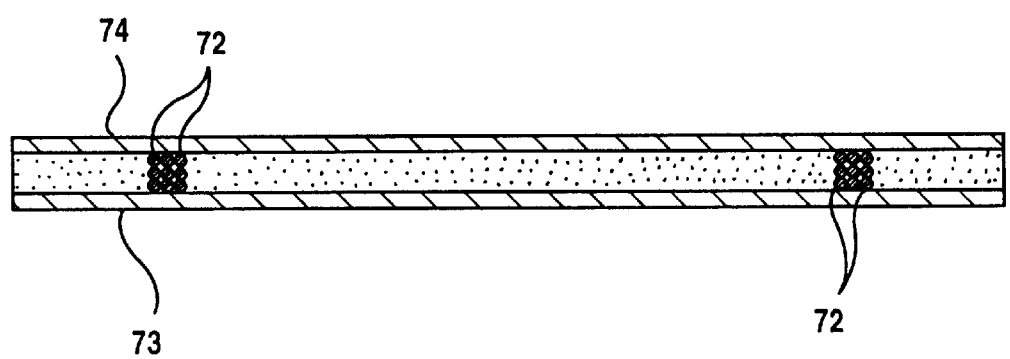
FIG. 20 is a sectional view, from the arrowed section A—A shown in FIG. 19.

FIG. 18 is the oblique view of the second transponder 70, FIG. 19 is the plan view of the transponder, and FIG. 20 is a section of the hose shown in FIG. 19, viewed from the arrowed section A—A.

Referring to FIG. 18, the transponder 70 is composed of the transponder element 71 and loop-shaped antenna line 72, placed between two films 63 and 64.

The films 73 and 74 are made of, e.g., polyimide film of 50 mm in width (W3) and 150 mm in length (L3), where the transponder element 71 and antenna line 72 are placed between the films 73 and 74, and bonded to these films by a resin.

The transponder element 71 is composed of the transponder element body 75, composed of semiconductor chips, and rectangular resin package 76 that covers the body 75, as is the case with the fifth embodiment. The electronic circuit for the transponder 71 has the same structure as that for the embodiment 1, except that it transmits/receives waves of 13.56 MHz in frequency.

The antenna line 72 is composed of conductors, 0.2 mm in diameter, bundled into a loop shape, each conductor being coated with an electrically insulating material, as shown in FIGS. 19 and 20. It length is set to make the line resonant with the transmitted/received waves of 13.56 MHz in frequency.

The antenna line 72 is so structured as to have a high "Q value" of, e.g., around 100. Such a high "Q value" may be realized by concentrating magnetic fluxes on one point to increase magnetic flux density.

The transponder 70 of the above structure communicates with the scanner in an ordinary manner, unless it is in contact with liquid being transferred. Even when the transponder 70 is in contact with liquid being transferred, little electrostatic capacity is generated by the liquid between the adjacent conductors that constitute the antenna line 72 wound into a loop, with the result that resonant frequency at the antenna line 72 is little biased from 13.56 MHz. The transponder 70 can communicate with the scanner in essentially the same manner whether it is in contact with liquid or not, because the waves are attenuated to a much smaller extent than those of 2 GHz in frequency for the first embodiment (attenuated by approximately 20 dB in the case of fuel oil).

Therefore, the sixth embodiment allows to detect leakage of liquid being transferred by the aid of the first transponder 60, as is the case with the fifth embodiment. Moreover, communication with the second transponder 70 allows to locate positions at which the transponders 60 and 70 are embedded, and also to access information stored in the memory for the transponder 70 even when liquid leakage occurs.

The transmitted/received wave frequency of 13.56 MHz and antenna 72 structure described above provide mere examples, and by no means limit those for the present invention. They are designed to continue communication as usual even when the transponders are in contact with leaked liquid.

The present embodiment takes, as an example, the transponders 60 and 70 provided in the hose 10" of single-carcass structure, similar to that for the first embodiment. However, the similar effects can be obtained when they are provided in the hose 10' with the liquid-flooding and soaking layer for the second embodiment, or in the hose 50 or 50' of double-carcass structure for the third or fourth embodiment. The similar effects can be also obtained when the transponder 70 for the sixth embodiment is used together with the transponder 20 for the first or fourth embodiment.

The structure described in the first or sixth embodiment is a mere example, and by no means limits the present invention. The transponder and hose structures described in the first and sixth embodiments may be adequately combined with each other.

The present invention can be applied in various forms, other than those described above, without being deviated from the principle and major characteristics it tries to provides. It is to be understood that the embodiments above described provide mere examples in any respect, and should not be taken to limit the present invention. The range of the present invention is limited by the range of the claims and not by description in this specification other than the claims. It should be also understood that changes or alterations within the equality range of the claims are within the range of the present invention.

We claim:

1. A liquid-transferring hose provided with a pressure-resistant cord layer outside of an internal rubber layer and a cover rubber layer covering said pressure-resistant cord layer, comprising:

a transponder which transmits and receives waves of specific frequency, transmits a response signal on receiving the waves of specific frequency above, and changes in its transmission characteristics on contacting liquid to be transferred, the transponder being installed between the inner rubber layer and cover rubber layer.

2. The liquid-transferring hose according to claim 1, which is of single-carcass structure with said pressure-resistant cord layer outside of an internal rubber layer and said cover rubber layer covering said pressure-resistant cord layer.

3. The liquid-transferring hose according to claim 2, wherein a liquid-flooding and soaking layer is provided between said pressure-resistant cord layer and cover rubber layer, the transponder being installed in the liquid-flooding and soaking layer.

4. The liquid-transferring hose according to claim 1, which is of double-carcass structure with said pressure-resistant cord layer as the main pressure-resistant cord layer outside of an internal rubber layer; an auxiliary pressure-resistant cord layer outside of the main pressure-resistant cord layer; a liquid-holding buffer layer installed between the main and auxiliary pressure-resistant cord layers, in which liquid infiltrates when it leaks out of the main pressure-resistant cord layer; and said cover rubber layer covering the auxiliary pressure-resistant cord layer.

5. The liquid-transferring hose according to claim 4, wherein said transponder is installed in said liquid-holding buffer layer.

6. The liquid-transferring hose according to one of claims 1 to 5, wherein said transponder is covered with a material in which liquid to be transferred easily infiltrates.

7. The liquid-transferring hose according to claim 6, wherein said material in which liquid to be transferred easily infiltrates is a non-woven fabric.

8. The liquid-transferring hose according to any one of claims 1 to 5, wherein said transponder is embedded in the hose near its edge.

9. The liquid-transferring hose according to any one of claims 1 to 5, wherein an adhesion-preventive material is placed between said transponder and rubber layer.

10. The liquid-transferring hose according to claim 1 wherein said transponder transmits and receives waves of specific frequency set at a level at which they are attenuated to a specified extent or more when they pass through a liquid to be transferred, and transmits a response signal on receiving the waves of specific frequency.

11. The liquid-transferring hose according to claim 1 wherein said transponder transmits and receives the waves of specific frequency, transmits a response signal on receiving the waves of specific frequency, and changes in resonant frequency at its antenna when in contact with a liquid to be transferred.

12. The liquid-transferring hose according to any one of claims 1 10 or 11, wherein a second transponder is installed near said transponder, the second transponder transmitting and receiving the waves of specific frequency even when in contact with a liquid to be transferred.

* * * * *